Aug. 20, 1940.  W. E. McCLEARY  2,212,350
GRAPPLE OF THE HAY-FORK TYPE
Filed March 1, 1939
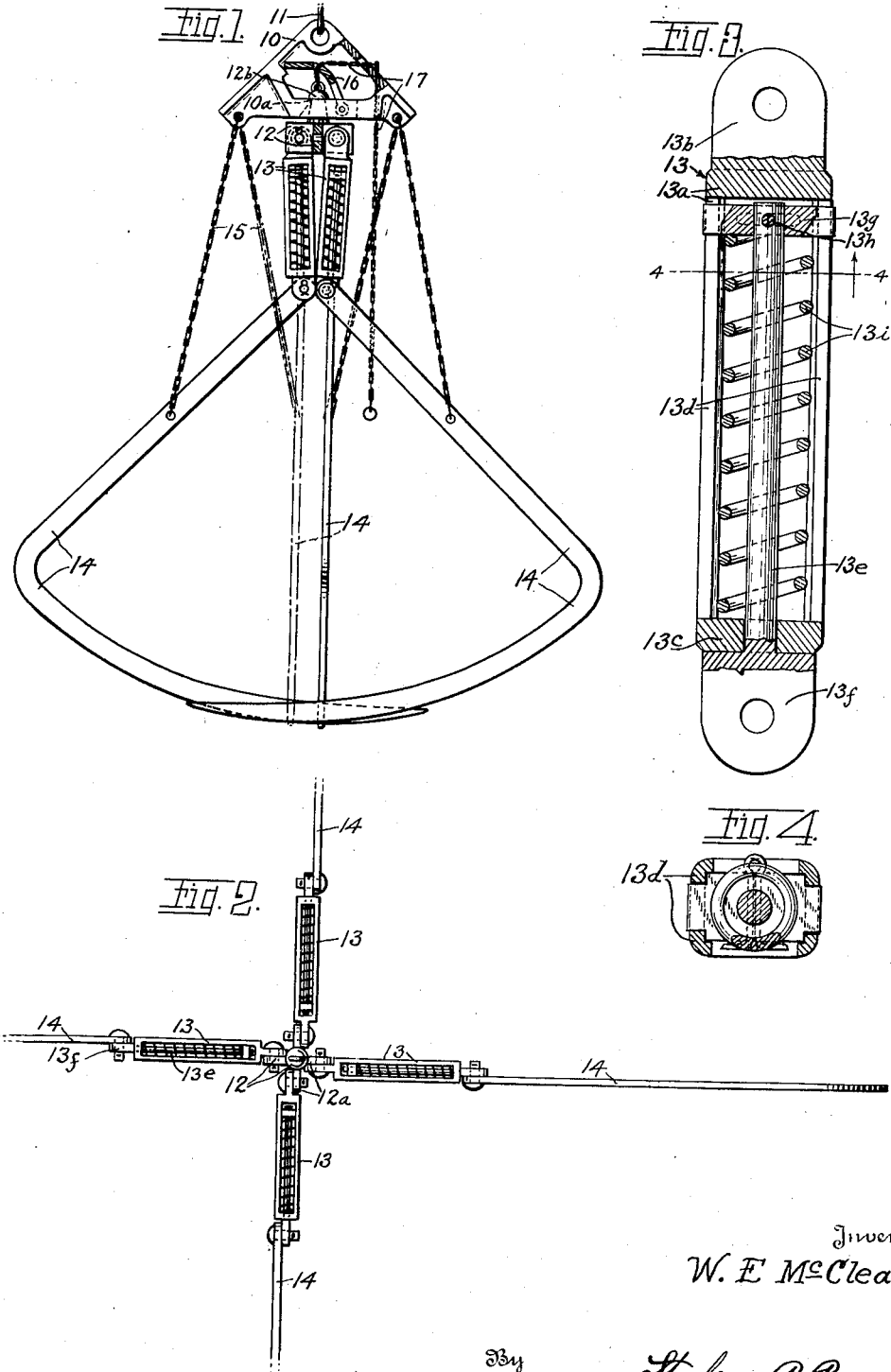
Inventor,
W. E. McCleary.
By
Sterling P. Buck,
Attorney.

Patented Aug. 20, 1940

2,212,350

UNITED STATES PATENT OFFICE 2,212,350

GRAPPLE OF THE HAY-FORK TYPE

Walter E. McCleary, Ottawa, Ill.

Application March 1, 1939, Serial No. 259,079

3 Claims. (Cl. 294—109)

This invention relates to grapples, and especially to the hayfork type, being an improvement on certain well known patented devices in that class.

One object of this invention is to provide an improved device for use in handling hay, straw, pea-vines and the like in a more convenient and efficient manner than is possible with previously known devices.

Another object is to provide, in a device of this kind, a set of spring-cushioned supporting and operating links, one for each of the tines, for yieldingly connecting the tines to the lifting and carrying frame through the medium of the unit which comprises the multiple connecting element and the dog or latching element; whereby to effect, first keeping the tines in their proper right-angular relation to one another and in proper relation to retain them in their upright position preparatory to being spread and pushed into the mass of hay or similar material to be grasped and carried thereby; second, to press the tines yieldingly but firmly and with constant pressure against the load being carried thereby, so there is no relaxing or diminishing of the gripping pressure during variations of speed of the hoist (not shown) that carries this device with its load; third, to cushion shocks occasioned by starting, changing speed-rates, and stopping of the hoist, so a smaller and less expensive hoist-line can be used without diminishing the safety against breaking of the hoist-line, and with a decrease of the dead-load and a corresponding saving of power and power-production means; fourth, to enable the spread of the tines to be extended beyond the normal, against pressure of the springs of the spring-cushioned links, and thus increase the load to be grasped and carried by this device, thereby eliminating the necessity and expense of providing several sets of tines of different lengths for varying the available load-capacities; and fifth, to enable the device to carry small loads without gripping them, for instance, scattered remnants of hay or the like that can be gathered and piled on the tines when in their normal contacted relation.

Other objects and important features are pointed out or implied in the following details of description, in connection with the accompanying drawing in which Fig. 1 is a view showing the device in its normal or contracted position, parts being in section, and one of the tines being omitted, but having its position indicated by dot-dash lines.

Fig. 2 is a top plan detail assembly view showing the multiple connecting head having the spring-cushioning links and tines pivotally connected thereto and spread in right-angular relation to one another, only one of the tines being complete, the others being broken off.

Fig. 3 is an enlarged longitudinal sectional view of one of the spring-cushioned links.

Fig. 4 is a cross-sectional view taken along the line 4—4 of Fig. 3.

Referring to the drawing in detail, in which similar reference numerals refer to similar parts in the several views, the invention is described in detail as follows:

In broad terms, the invention consists of a frame provided with supporting and hoisting means that includes a hoist-line 11, a multiple connecting element 12 normally secured to the frame 10 and releasable therefrom, spring-cushioning links 13 each having one end pivotally secured to the multiple connecting element and having its other end pivotally secured to one of several tines 14, and flexible or collapsible elements 15 each having one end secured to the frame 10 and its other end secured to one of the several tines.

While these drawings show four tines at right angles to one another, it is quite within the scope of this invention to either increase or diminish the number of tines and to provide the same number of properly spaced and arranged connecting ears 12a of the multiple connecting element 12, also the same number of cushioning elements 13.

Referring again to the frame 10, it is seen that it is provided with a keeper-element 10a that is normally engaged with a latch-element 12b, and an apertured pivoted arm 16 cooperates with a pullcord, cable or chain for releasing this latch-element from the keeper-element when it is desired to effect the dumping or releasing of the load grasped by the device. Chains or other flexible connections 15 have their lower ends connected to the intermediate parts of the pivoted connecting arms 14a. These elements, all except the spring-cushion links 13 are previously known; but the combination of these parts with spring-cushion links comprises the very important feature of my invention, for purposes previously mentioned herein. These spring-cushion links take the place of chains previously used and which permitted the tines to fall flat in a conglomerate relation to one another, in contradistinction to these spring-cushion links that normally hold the tines in the upright position shown (see Fig. 1).

Each of these spring-cushioning links is composed of an open frame 13a having an apertured connecting ear 13b at one end and a plunger-bearing 13c at its other end, its intermediate parts comprising four parallel guide-bars 13d; a rod or plunger 13e is slidably mounted in the bearing 13c and has an apertured connecting ear 13f on one end while its other end is provided with a spring-seat 13g removably secured on the plunger by appropriate means such as (for instance) a split cotter-pin 13h; and a spring 13i is compressed between the bearing seat and the apertured end that constitutes the bearing for the plunger.

From the foregoing, it is easily seen that when the apertured ear of the plunger is pulled away from the open frame, the link 13 becomes elongated to an extent commensurate with the weight of the load or to the pull exerted on the tines in extending them laterally from the multiple connecting head 12. When it is desired to interchange springs 13i so as to substitute a more flexible or weaker spring for a stiffer or stronger spring, the cotter-pin 13h is first removed, the spring seat thereby released from the rod 13e, and the rod is then withdrawn sufficiently to permit the interchange of the springs.

Although I have described this invention in all its details, I have no intention to limit my patent protection to these precise details, for the invention is susceptible of numerous changes within the scope of the inventive ideas, as implied and claimed.

What I claim as my invention is:

1. In a device of the character described, the combination of a frame provided with supporting means for raising and lowering it and with a keeper element, a multiple connecting head provided with a latch-element normally engaged with and releasable from said keeper element, a set of spring-cushioning elements, bent tines each having one end pivotally connected to said multiple connecting head through the medium of a corresponding one of said spring-cushioning elements, and flexible elements connected to intermediate parts of the tines and also connected to said frame, for purposes specified.

2. In a device of the character described, the combination of a frame provided with supporting means for raising and lowering it and with a keeper-element, a multiple connecting head having several pivot-carrying projections in substantially equi-spaced relation around a centrally disposed part that is normally engaged with said keeper and releaseable from the latter, several spring-cushioning elements each having one end pivoted to a respective one of said pivot-carrying projections in the proper relation to be swung from a normally upright position to a horizontal position wherein all these cushioning elements are held at a definite predetermined angular relation to one another, several hook-like tines each comprising an arm having one end pivoted on a respective one of the spring-cushioning links in the proper relation to be alined with the respective links when said links and arms are in horizontal position, and flexible connecting elements each having a part secured to said frame and another part secured to an intermediate part of one of said arms, for purposes specified.

3. In an extensible spring cushioning device for replacing non-cushioning non-extensible elements of devices of the hay-fork type, the combination of an open frame having a pivot-bearing in one end and a plunger-bearing in its other end and a set of parallel guide-bars comprising two opposite pairs between the plunger-bearing and pivot-bearing, a spring-seat having an opening therethrough and having parts extending through spaces between the guide bars of said pairs, a plunger having one end secured in said opening of said spring seat and having its other end provided with a pivot bearing, and a compression spring seated between said spring seat and said plunger-bearing and being compressible so as to permit the first-said pivot-bearing to be moved away from the second said pivot bearing while being secured against relative rotary motion by cooperation of said spring-seat with said guide-bars, substantially as shown, for purposes specified.

WALTER E. McCLEARY.